US012645245B2

(12) United States Patent
Lawniczak et al.

(10) Patent No.: US 12,645,245 B2
(45) Date of Patent: Jun. 2, 2026

(54) FORCE APPLICATION DEVICE FOR AN ACTIVE MINI-STICK AND MECHANICAL BACKUP CONTROL METHOD

(71) Applicant: SAFRAN ELECTRONICS & DEFENSE, Boulogne-Billancourt (FR)

(72) Inventors: Rémi-Louis Lawniczak, Boulogne Billancourt (FR); Pascal Coppee, Boulogne Billancourt (FR); Nicolas Baro, Boulogne Billancourt (FR); Yannick Ghislain Attrazic, Boulogne Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 1420 days.

(21) Appl. No.: 17/275,386

(22) PCT Filed: Sep. 13, 2019

(86) PCT No.: PCT/FR2019/052142
§ 371 (c)(1),
(2) Date: Mar. 11, 2021

(87) PCT Pub. No.: WO2020/053534
PCT Pub. Date: Mar. 19, 2020

(65) Prior Publication Data
US 2022/0057826 A1 Feb. 24, 2022

(30) Foreign Application Priority Data
Sep. 13, 2018 (FR) ....................................... 1858234

(51) Int. Cl.
G05G 9/047 (2006.01)
B64C 13/04 (2006.01)
(Continued)

(52) U.S. Cl.
CPC ......... G05G 9/047 (2013.01); B64C 13/0421 (2018.01); F16D 57/002 (2013.01);
(Continued)

(58) Field of Classification Search
CPC .... G06F 3/045; G06F 3/046; G06F 2203/015; G01L 5/223; G05G 9/047; G05G 5/03;
(Continued)

(56) References Cited

U.S. PATENT DOCUMENTS

| | | | |
|---|---|---|---|
| 6,339,419 B1 * | 1/2002 | Jolly ........................ | G06F 3/011 |
| | | | 434/45 |
| 8,493,190 B2 * | 7/2013 | Periquet .................. | F16F 9/535 |
| | | | 340/407.1 |

(Continued)

FOREIGN PATENT DOCUMENTS

| | | |
|---|---|---|
| DE | 4435289 C1 | 3/1996 |
| DE | 102005060933 B3 | 6/2007 |

(Continued)

OTHER PUBLICATIONS

Search Report dated May 6, 2019 from the French Patent Office in FR Application No. 1858234.
(Continued)

*Primary Examiner* — Benjamin P Lee
(74) *Attorney, Agent, or Firm* — Sughrue Mion, PLLC

(57) ABSTRACT

A force application device for an aircraft control stick in provided. The device includes a mechanical joint, a force motor, a rheological brake, and a control device. The mechanical joint receives a lever of an aircraft pilot stick and is rotatably movable. The force motor includes a motor shaft extending along a third axis, the rotation of the motor shaft being linked to the rotation of the mechanical joint. The force motor exerts a resistive torque on the motor shaft. The rheological brake includes two facing parts, and has a
(Continued)

volume delimited by the two facing parts, the volume being adapted to contain a rheological material. One of the parts is arranged on the motor shaft and rotatably movable about the third axis relative to the other of the parts. The control device applies an electromagnetic field within the volume so as to vary shear strength of the rheological material.

26 Claims, 10 Drawing Sheets

(51) Int. Cl.

| | |
|---|---|
| *F16D 57/00* | (2006.01) |
| *G05G 5/03* | (2008.04) |
| *H02K 11/24* | (2016.01) |
| *H02K 26/00* | (2006.01) |

(52) U.S. Cl.
CPC .............. *G05G 5/03* (2013.01); *H02K 11/24* (2016.01); *H02K 26/00* (2013.01); *F16D 2200/006* (2013.01); *G05G 2009/04718* (2013.01); *G05G 2009/04766* (2013.01); *G05G 2009/04774* (2013.01); *G05G 2505/00* (2013.01); *G05G 2700/02* (2013.01)

(58) Field of Classification Search
CPC .......... G05G 2009/04718; G05G 2009/04766; G05G 2009/04774; G05G 2505/00; G05G 2700/02; H02K 11/24; H02K 26/00; B64C 13/0421; F16D 57/002; F16D 2200/006
See application file for complete search history.

(56) References Cited

U.S. PATENT DOCUMENTS

| | | | | |
|---|---|---|---|---|
| 8,622,864 | B2 * | 1/2014 | Fauteux ................... | B25J 9/102 |
| | | | | 475/221 |
| 9,656,746 | B2 * | 5/2017 | Latham ................... | B64C 27/68 |
| 10,963,051 | B2 * | 3/2021 | Eck ........................... | G05G 5/03 |
| 11,048,330 | B2 * | 6/2021 | Eck ........................... | G06F 3/045 |
| 11,433,989 | B2 * | 9/2022 | Lawniczak ......... | B64C 13/0421 |
| 11,599,136 | B1 * | 3/2023 | Morrison ................ | G06F 3/016 |
| 2001/0052893 | A1 * | 12/2001 | Jolly ..................... | G06F 3/0338 |
| | | | | 345/156 |
| 2011/0045932 | A1 * | 2/2011 | Fauteux ................... | B25J 9/102 |
| | | | | 475/221 |
| 2011/0128135 | A1 * | 6/2011 | Periquet .................. | F16F 9/535 |
| | | | | 340/407.2 |
| 2014/0085765 | A1 * | 3/2014 | Gurocak ................. | H01F 38/00 |
| | | | | 361/152 |
| 2015/0107395 | A1 * | 4/2015 | Kermani .................. | B25J 19/06 |
| | | | | 901/49 |
| 2015/0217865 | A1 * | 8/2015 | Spina ...................... | B64C 27/64 |
| | | | | 244/227 |
| 2016/0124458 | A1 | 5/2016 | Yamaguchi et al. | |
| 2016/0221672 | A1 | 8/2016 | Latham et al. | |
| 2017/0227980 | A1 * | 8/2017 | Hafez ...................... | F16F 9/535 |
| 2019/0286237 | A1 * | 9/2019 | Eck ........................ | G06F 3/0338 |
| 2022/0348310 | A1 * | 11/2022 | Lawniczak .............. | G05G 5/03 |
| 2023/0020880 | A1 * | 1/2023 | Guillon ................... | B64C 13/38 |
| 2023/0028481 | A1 * | 1/2023 | Joncour ................. | G05G 9/047 |

FOREIGN PATENT DOCUMENTS

| | | | |
|---|---|---|---|
| EP | 2 081 822 | B1 | 7/2010 |
| FR | 2 647 922 | A1 | 12/1990 |
| FR | 3 011 815 | A1 | 4/2015 |
| FR | 3 056 315 | A1 | 3/2018 |
| GB | 2516008 | A | 1/2015 |
| JP | 2017-182148 | A | 10/2017 |
| WO | 96/42078 | A1 | 12/1996 |

OTHER PUBLICATIONS

International Search Report dated Jan. 8, 2020 from the International Searching Authority in International Application No. PCT/FR2019/052142.

* cited by examiner

FORCE APPLICATION DEVICE FOR AN ACTIVE MINI-STICK AND MECHANICAL BACKUP CONTROL METHOD

CROSS REFERENCE TO RELATED APPLICATIONS

This application is a National Stage of International Application No. PCT/FR2019/052142 filed on Sep. 13, 2019, claiming priority based on French Patent Application No. 1858234 filed on Sep. 13, 2018, the entire contents of each of which are herein incorporated by reference in their entireites.

TECHNICAL FIELD OF THE INVENTION

The invention concerns the pilot devices used by the pilot in an aircraft cockpit, in particular an active stick comprising an integrated force feedback to assist the pilot.

PRIOR ART

A pilot device in an aircraft cockpit usually comprises a pilot stick comprising in particular a lever rotatably mounted along an axis called roll axis and an axis called pitch axis, these two axes being orthogonal to each other. Devices of the "joystick" type are most often encountered. Depending on the position of the lever along the two axes, the pilot device transmits displacement commands to pilot members of the aircraft.

On the most recent aircraft models, the command of the movements of the aircraft is electronic and the pilot device integrated into the cockpit can be of the "mini-stick" type. The position of the lever along the two roll and pitch axes is measured by sensors and expressed in displacement commands. The lever is not directly linked mechanically to the movable portions of the aircraft and there is no direct mechanical feedback on the lever.

However, it is desirable for flight safety that the pilot perceives a mechanical feedback at the lever. The signaling systems of the cockpit may not be sufficient to cause the pilot to react quickly enough to unforeseen events during flight. The piloting is much better if the pilot mini-stick integrates a force feedback, also called "haptic feedback".

As such, it has been proposed to equip the mini-stick with passive mechanical systems, such as spring systems or active electromechanical systems.

Patent document FR 3 011 815 describes an aircraft flight control device including a control lever mounted on a plate and linked to a roll axis motor and a pitch axis motor by means of the transmission shafts. The two motors are controlled according to a force law, so as to generate a resistive force opposing the force exerted on the lever (force feedback) when a force threshold is exceeded by the pilot.

A force feedback device with electric motor is effective to restore the piloting feelings and increase safety.

However, in the event of an electrical or mechanical fault at one of said motors, or in the event of failure on the motor control signal processing chain, the force feedback can be deleted.

In the field of aeronautics, the requirements in terms of availability of the pilot devices are high. It is not acceptable that the pilot suddenly switches to a pilot mode without force feedback in the event of fault.

In addition, the active force feedback systems of the state of the art often comprise a large number of components, in particular the roll and pitch motors but also clutches, torque limiters, gears, etc. These systems can be costly, bulky and difficult to integrate into an aircraft cockpit.

Document EP 2 081 822 B1 describes an aircraft haptic interface comprising electrically controlled piston dampers supplementing electric force feedback motors if necessary, to exert a resistive torque opposing the pivoting of a lever. However, in the architecture proposed in this document, each damper is linked by connecting rods to the lever, to transform a translational movement of the piston into a rotary torque. The force feedback motors act themselves on the lever by means of gears achieving a reduction of speed.

The mechanical linking members increase the bulk and reduce the service life of the haptic interface. The angular travel allowed for the lever is low, which affects the ergonomics of the lever. The architecture proposed in this document is complex because the piston dampers are mounted in parallel with the force feedback motors.

In addition, magnetorheological fluid particles inside the piston damper may stratify during the periods when the piston is unused, thereby further reducing the service life of the dampers.

Document US 2001/0052893 A1 describes a motor vehicle haptic interface including magnetorheological brakes exerting a variable resistive force opposing the pivoting of a lever by the user. Each brake acts on the lever via a series of gears comprising at least one intermediate shaft. In the variant illustrated in FIGS. 8a and 8b of this document, the angular travel allowed for the lever is limited and the use of the lever is not very ergonomic. In addition, this document describes a servo-control of the magnetorheological brakes via force sensors. The presence of intermediate gears indeed requires a monitoring of the torque exerted by the brakes as a function of a torque measured on the lever.

Finally, the magnetorheological brakes in this document are intended to ensure by themselves the haptic feedback. These brakes are only used to resist the displacements of the lever induced by the pilot, and not to generate a movement on the lever.

In addition, an introduction of intermediate mechanical members between the brakes and the lever, such as gear trains or connecting rods, implies a reduction in the dynamic performances of the stick, whose inertia increases.

GENERAL PRESENTATION OF THE INVENTION

There is therefore a need for a pilot mini-stick integrating a mechanical back-up path, to prevent rotation of the lever from being completely free in the event of an electrical fault affecting a force feedback motor.

The desired mini-stick must not be able to switch, in the event of failure, in a mode where the pilot can freely pivot the lever without feeling a resistive force.

There is a subsidiary need for a mini-stick of lower mass, bulk and power consumption.

In general, the reliability, the mechanical simplicity and the ergonomics of the existing force feedback devices for a pilot stick can be improved. The existing systems do not allow sufficient angular displacement of the stick.

As such, the invention is directed, according to a first aspect, to a force application device for an aircraft pilot stick, this device being in accordance with claim 1.

The rheological brake, associated with the electromagnetic field control device, constitutes a mechanical back-up path able to take over from the force motor in the event of fault affecting said motor or its monitoring chain (for example a loss of power supply or a fault in the computers).

The shear strength of the rheological material (for example an electrorheological or magnetorheological fluid) is changeable depending on the electromagnetic field applied thereto. The electromagnetic field control device can be electronically monitored to vary stresses within the rheological brake, these stresses opposing the movement induced by the pivoting of the lever.

Indeed, depending on the electromagnetic field applied, it is possible to brake or prevent the relative rotary movement between the part arranged on the motor shaft and the facing part. A resistive torque is exerted by the brake on the motor shaft and opposes the rotational movement of the mechanical joint by means of the motor shaft.

The force application device is devoid of mechanical transmission members, for example angle transmission elements or elements achieving a reduction of speed, between the rheological brake and the shaft of the force feedback motor. Advantages of this construction are a reduced bulk of the rheological brake, a better transmission of the resistive torque on the lever and a better general ergonomics of the mini-stick integrating this device due to the absence of parasitic torque variations.

In the case where the force motor is a direct drive motor, the rheological brake can also act on the axes of rotation of the lever by direct drive.

An additional advantage is the absence of additional friction generating parts between the rheological brake and the motor shaft. The service life of the rheological brake is improved and the presence of the force application device has little impact on the angular travel ranges of the lever.

In addition, strong stratification of the particles of the rheological material is avoided during the inactivity ranges of the rheological brake because the rheological material is directly positioned between the movable parts in rotation relative to each other.

According to a possible variant, it is possible to provide for a blockage of the lever via the rheological brake, in the event of failure affecting the force motor.

The rheological brake can be further configured to exert a force feedback according to a force and/or damping law instead of or as a complement to the force motor. The rheological brake then participates in the normal operation of the mini-stick. It is then not necessary to arrange in the mini-stick electric motors that are dimensioned to exert by themselves the maximum resistive forces provided over the range of use of the stick. It is therefore possible to reduce the mass and bulk of the mini-stick.

The stress application device of the invention may include the following, optional and non-limiting characteristics taken alone or in any one of their technically possible combinations:

the rheological material is a magnetorheological fluid comprising suspended magnetic particles, or the rheological material is an electrorheological fluid comprising suspended conductive particles, the control device being controlled to apply a variable magnetic or electric field.
the rheological material is a magnetic powder dispersed between the two facing parts.
the force motor is a torque motor.
the force motor is a direct drive motor.
the rheological brake is positioned on the motor shaft opposite the mechanical joint relative to the force motor.

the rheological brake is positioned on the motor shaft between the mechanical joint and the force motor.
the two parts facing the rheological brake are located facing each other along the third axis.
the force application device comprises a motor shaft rotational speed sensor, the rheological brake being piloted according to a speed servo-control as a function of a rotational speed acquired by said sensor.
the two facing parts of the rheological brake are a first disk extending radially from the motor shaft and a second disk facing the first disk, the first disk and the second disk being centered on the third axis.
the two facing parts of the rheological brake are: a sphere centered on the motor shaft and at least partially immersed in the rheological material, and a spherical base.
the control device is controlled to apply an electromagnetic field increasing the shear strength of the rheological material, in the event of fault on a processing chain of the force motor.
the slip torque of the rheological material is comprised between 10 N·m and 100 N·m, preferably between 10 N·m and 75 N·m.
The force application device further comprises a roll force sensor configured to measure a roll torque exerted on the lever, and/or a pitch force sensor configured to measure a pitch torque exerted on the lever, to allow a force-piloting of the pilot stick.
the rheological brake is configured to exert a resistive torque on the mechanical joint, a value of which is limited to 70 N·m, preferably 25 N·m, as a function of an electric current provided to the control device.
the control device is controlled according to a predetermined law to exert an electromagnetic field which is a function of a position and/or speed of the lever.
the force motor is a roll motor, the rotation of the motor shaft being linked to the rotation of the mechanical joint about the roll axis, the rheological brake being adapted to exert a force feedback on the roll axis,
the device further comprises a pitch motor comprising a pitch motor shaft extending along a fourth axis, the rotation of the pitch motor shaft being linked to the rotation of the mechanical joint about the pitch axis, and comprises an additional rheological brake adapted to exert a force feedback on the pitch axis.

According to a second aspect, the invention concerns an active aircraft pilot stick, comprising a force application device as defined above associated with a lever able to rotate about the roll axis and the pitch axis, the lever being arranged on the mechanical joint.

The invention also concerns an aircraft comprising such a pilot stick.

According to a third aspect, the invention relates to a method for mechanical back-up monitoring of a device for applying a force on an aircraft pilot stick, the method being implemented using a force application device as defined above and comprising the steps of: detecting a fault on a processing chain of a force motor of the force application device, generating an electromagnetic field control below a slip torque of a rheological material contained in a rheological brake of the force application device, said control being transmitted to a device for controlling the force application device to block the lever.

In an optional and non-limiting manner, this method comprises an additional step of activating a force pilot mode of the stick.

According to a fourth aspect, the invention relates to a method for monitoring in damping law a device for applying a force on an aircraft pilot stick, the method being implemented using a force application device as defined above and comprising the steps of:

detecting a position and/or speed of a lever in rotation about a roll axis or a pitch axis, the lever being arranged on a mechanical joint of the force application device, generating an electromagnetic field control according to a predetermined law as a function of the detected position and/or speed, said control being transmitted to a device for controlling the force application device, so that a rheological brake of the force application device exerts a resistive torque opposing a rotational movement of the lever as a complement to a force motor of the force application device.

GENERAL PRESENTATION OF THE FIGURES

Characteristics, aims and advantages of the invention will emerge from the following description, which is purely illustrative and not limiting, accompanied by the appended drawings, among which:

FIG. 1 schematically represents pilot stick architecture according to one embodiment of the invention;

FIG. 2 is a perspective view of a lever and of a mechanical joint of a mini-stick;

FIG. 3 schematically represents a force application device for a stick according to a first variant comprising a rheological brake according to a first variant;

FIGS. 9b and 9c are block diagrams of the operation of a magnetic powder in the brake of FIG. 9a;

Figure 10:
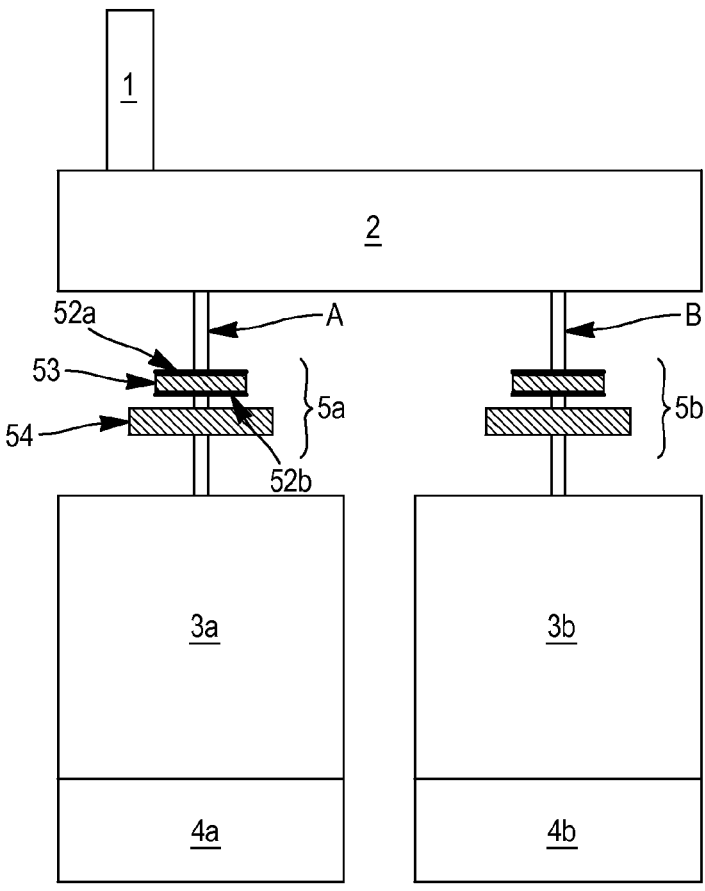
Figure 11:
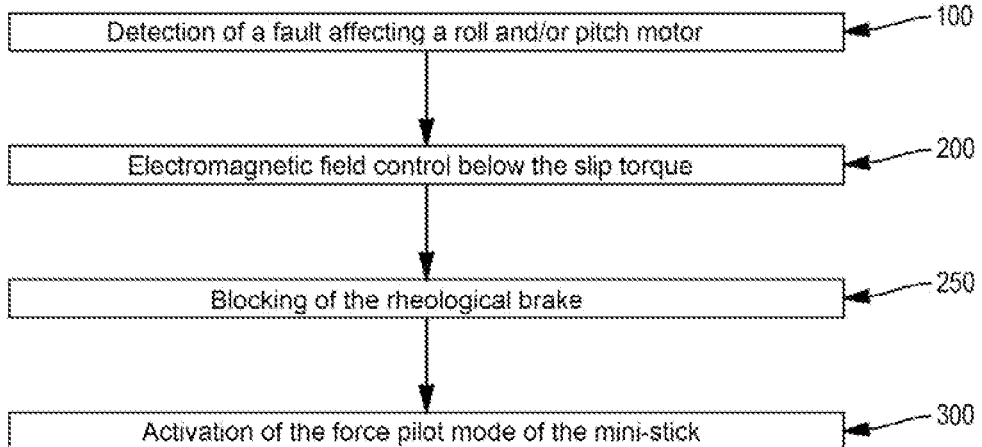
Figure 12:
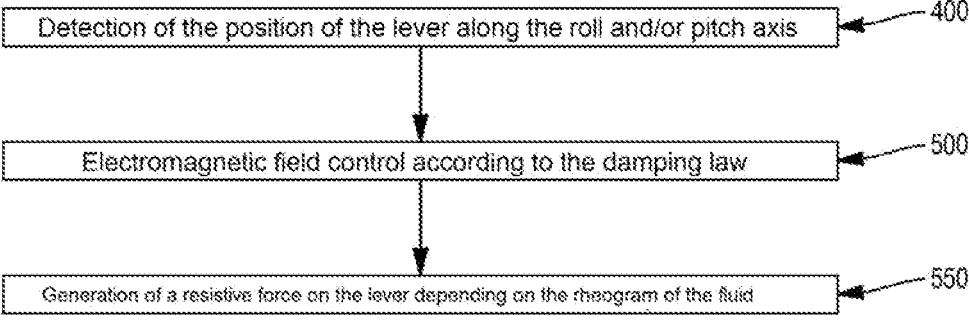

FIG. 10 schematically represents a force application device for a stick according to a second variant;

FIG. 11 illustrates the steps of a method for monitoring a force application device of the invention, in mechanical back-up;

FIG. 12 illustrates the steps of a method for monitoring a force application device of the invention, in damping law.

DETAILED DESCRIPTION OF EMBODIMENTS

The following describes examples of devices for applying a force on a lever of an aircraft pilot mini-stick comprising at least one "rheological brake", that is to say a brake including a volume configured to be filled with a rheological material. It is meant by "rheological material" a solid or liquid material whose shear strength is variable as a function of an electromagnetic field applied thereto, according to a predetermined characteristic (or rheogram). For example, the viscosity of the rheological material is variable as a function of the electromagnetic field. It is meant by "electromagnetic field" a field which can be a solely electric or solely magnetic field or comprise a magnetic component and an electric component.

Furthermore, it is meant by "damping law" of a rheological brake the relationship between the rotary position of the lever along an axis of rotation and the resistance force produced by the brake against displacement about said axis. It is meant by "force law" of the force application device taken as a whole (rheological brake(s) possibly completed by electric motors) the force, which can be a resistive or a motor force, restored as a function of the position of the lever along the axis.

Similar elements in the appended figures will be designated by the same alphanumeric references throughout the description below.

Overall Architecture of the Pilot System

Figure 1:
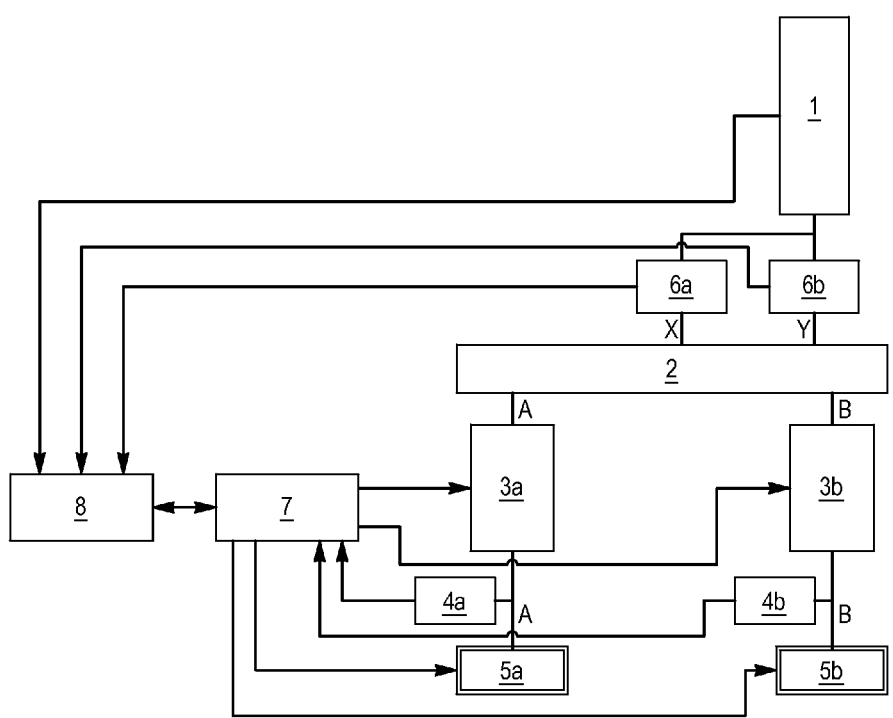

FIG. 1 represents a functional architecture of the pilot system of an aircraft along its roll and pitch axes comprising in particular a pilot mini-stick. The mini-stick is typically located in the cockpit of the aircraft.

In this figure, the thicker lines between two functional units correspond to mechanical links. The other arrow links are electronic links through which data can flow.

The system comprises a control lever 1 rotatably mounted on a mechanical joint 2 along a roll axis X and a pitch axis Y of the lever, the two axes being orthogonal. Preferably, the lever 1 is mounted on a plate of the mechanical joint 2. The joint is fixed to a mount secured to the floor of the aircraft cockpit.

Position sensors, preferably a sensor 4a associated with the roll axis and a sensor 4b associated with the pitch axis, communicate electronic signals of the rotary position of the lever 1 respectively along the axes X and Y to a computer 7. The computer 7 performs the piloting of the force application device in order to achieve a predetermined force law. The computer 7 comprises an electronic interface to receive said position signals. The sensors 4a and 4b also communicate information on the speed of rotation of the lever 1 along these axes. The lever position/speed information are expressed in control signals for piloting movable portions of the aircraft by a flight control unit 8, or FCS (Flight Control System).

As will be described below, the control unit 8 is also configured to determine, as a function of the lever position/speed information and possibly other information, commands for applying a force on the lever 1. The computer 7 determines, as a function of the force application commands, control signals for the force application device associated with the mini-stick.

In the present example, the force application device comprises an electric motor 3a having an A-axis motor shaft. The motor shaft is linked to the roll axis X of the lever. It is meant by "linked to the axis" that a linking mechanism exists between the A-axis motor shaft and the joint 2 which is set in motion when the lever pivots along the axis X.

Preferably, the electric motor 3a is a torque motor. It is a motor capable of transmitting a large rotary torque on the motor shaft, even in the event of blocking of the rotor. Typically, the torque motor used is a motor with low rotational speed and high rotary torque.

The use of this type of motor is advantageous because the main objective of this motor is to transmit a variable resistive torque on the lever by means of the joint, and not to move the lever.

Preferably, the motor 3a is a direct drive motor. This eliminates the need for a reduction gear train; there is no speed reduction between the motor shaft and the plate of the mechanical joint. In addition, the motor acts directly on the plate, without angle transmission.

In addition, the use of force feedback motors allows generating a movement on the lever. It is thus possible to provide a feedback on the lever, in particular to bring it back to a predetermined anchoring point. Haptic interfaces of the state of the art which comprise only brakes only allow a damping of pivotal movements of the lever, and do not allow implementing a feedback.

Likewise, the device comprises an electric motor 3b associated with a B-axis motor shaft linked to the pitch axis Y of the lever, which is preferably a torque motor and which is advantageously a direct drive motor.

The force application device further comprises two magnetorheological brakes, a first brake 5a linked to the axis A and a second brake 5b linked to the axis B.

Preferably, the brakes are directly positioned respectively on the shaft of the A-axis motor 3a and the shaft of the B-axis motor 3b. it is meant by "directly positioned" that the parts performing the braking (for example brake disks, as will be seen below) are arranged directly on the motor shaft. There are preferably no intermediate mechanical members between the parts performing the braking and the motor shaft.

In particular, the brake 5a is aligned directly with the axis A of the motor shaft. If the roll motor 3a is located vertically under the lever, the brake 5a is preferably vertically integrated on the A-axis motor shaft. There is no angle transmission between the brake 5a and the motor shaft. Preferably, the brake 5b is likewise vertically integrated on the B-axis motor shaft.

Thus, the horizontal bulk of the assembly formed by the mechanical joint, the force feedback motors and the rheological brakes is reduced.

Each of the magnetorheological brakes comprises a control device configured to vary a magnetic field, said device being electronically controlled by the control unit 8 via the computer 7, either in mechanical back-up in the event of fault in the motor 3a and/or the motor 3b, or in damping law, for example according to a monitoring method described below.

Alternatively, the force feedback motors 3a and 3b could be omitted from the pilot system, by maintaining the brake 5a configured to act on the roll axis and the brake 5b configured to act on the pitch axis.

Optionally, the pilot system also comprises force sensors 6a and 6b measuring respectively the torque exerted on the lever pivotally along the axis X and along the axis Y. These are for example capacitive or piezoelectric sensors.

Such sensors are in particular useful if the pilot system comprises a force pilot mode, in which the lever is immobilized and the control unit 8 determines control signals of the movable portions of the aircraft as a function of the forces applied on the lever 1.

It will however be noted that it is possible to omit the force sensors 6a and 6b, in particular in the event where the rheological brakes are used only to simulate a damping law on the lever. Due to the absence of intermediate mechanical members between the rheological brakes and the motor shaft, the rheological brakes are preferably piloted directly by a speed servo-control. The monitoring of the brakes therefore does not necessarily require torque information.

Figure 2:
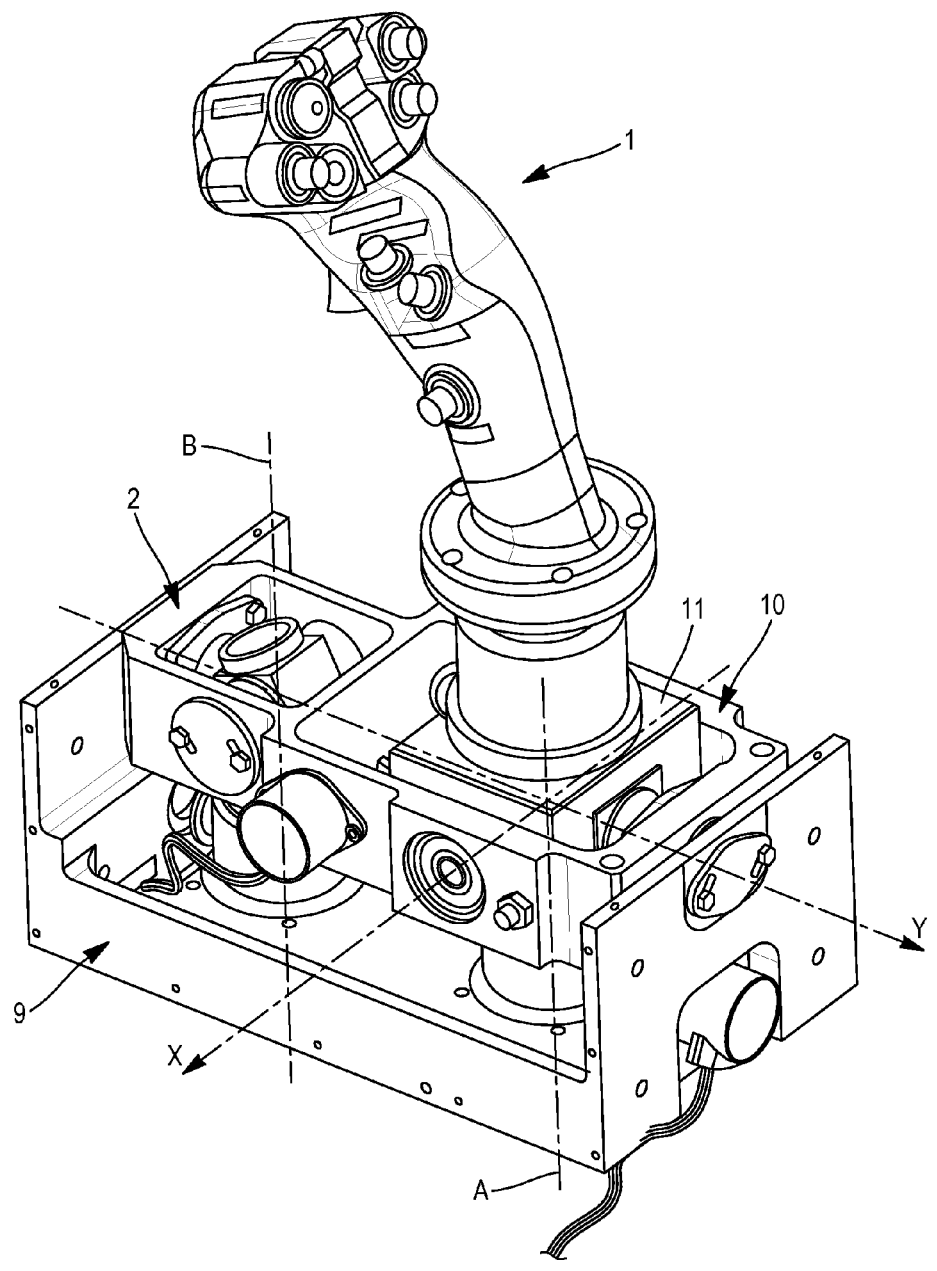

FIG. 2 represents an exemplary embodiment. The lever 1 is arranged on a mechanical joint 2 fixed to a mount 9 secured to a frame of the aircraft. The motors 3a and 3b (not visible) are offset from the lever. The brakes 5a and 5b are also offset from the lever. As indicated above, the motors 3a and 3b and the brakes 5a and 5b are preferably vertically integrated under the mechanical joint.

Lever 1 is free at one end and fixed to a first plate 11 at the other end. The first plate 11 is rotatably movable along the axis X and along the axis Y and is linked to a second plate 10 of the joint 2. The axis X is linked to the first plate 11 so that a pivoting of the first plate 11 about the axis Y pivots the axis X about the axis Y.

Two transmissions, each comprising a Cardan joint, express a rotational movement of the lever along the axis X, respectively along the axis Y, into a rotational movement of a shaft (not represented) extending along the axis A, respectively along the axis B.

The motors 3a and 3b are thus in direct engagement on the mechanical joint 2 and can transmit a resistive or motor force in response to the pivotal movements of the lever 1 by the pilot, according to a predetermined force law or damping law. The motors 3a and 3b are preferably "direct drive" motors, which allows increasing the service life of the mini-stick and which allows limiting the parasitic torque variations felt by the user of the stick.

For more details on the structure of the joint 2 and on the mechanical link with the motors 3a and 3b, reference may be made to FIG. 1 of document FR 3 011 815 and to the description relating thereto.

Figure 3:
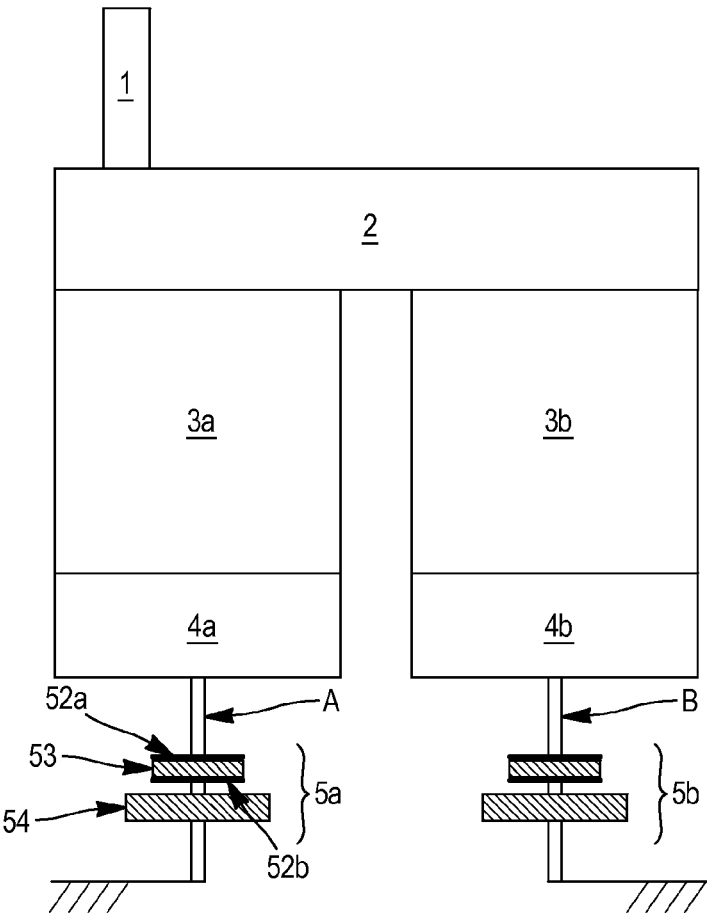

FIG. 3 represents architecture of the force application device integrated into the mini-stick according to a first embodiment.

In this example, the brake 5a, respectively 5b, acts on the axis A, respectively B, and is located opposite the mechanical joint 2 relative to the corresponding motor. An advantage of this configuration is to be able to offset the magnetorheological brake relative to the joint receiving the lever, which allows reducing the bulk of the space in the vicinity of the lever and saving space in the cockpit.

Magnetorheological Brake of the Force Application Device

A magnetorheological brake 5a will be described in the following, the brake 5b being similar to the brake 5a in terms of structure and operation.

In the example of FIG. 3, an output shaft of the brake 5a extends directly along the axis A and is coaxial with a shaft of the roll motor 3a.

The brake 5a comprises at least two parts 52a and 52b facing each other and adapted to be set in motion relative to each other. In the present example, the parts 52a and 52b are adapted to rotate about the axis A. It is meant by "facing parts" that at least portions of the outer surfaces of the two parts are facing each other without being in contact. The brake further comprises a volume 53 delimited by the two facing parts, adapted to receive magnetorheological fluid. The volume 53 is hermetic so as not to let the magnetorheological fluid leak.

It is meant by "volume delimited by the two facing parts" that the portions of the surfaces of the two parts which are located facing each other are, at least partially and preferably totally, in contact with the volume of magnetorheological fluid.

One operating principle of the brake is to vary the shear strength of the fluid contained in the volume 53, the two parts 52a and 52b shearing the fluid during their relative rotation about the axis A. The shear strength torque exerted by the fluid is variable as a function of the magnetic field.

Preferably, the two parts 52a and 52b are located one facing the other along the axis A of extension of the motor shaft. The two parts shear the rheological fluid substantially perpendicularly to the axis A of the motor shaft.

In order to vary the shear strength torque and to control the brake by the computer 7, the brake comprises a control device 54 configured to apply a variable magnetic field within the volume 53.

Preferably, the rheological brake 5a is speed servo-controlled, as a function of the speed of rotation of the motor shaft. The brake is controlled according to the speed of rotation of the motor shaft about its axis A, detected by a speed sensor which may be the sensor 6a or another sensor.

Indeed, the brake acts directly on the motor shaft, without intermediate mechanical members. It is therefore not necessary to pilot the brake by a torque servo-control.

Figure 4:
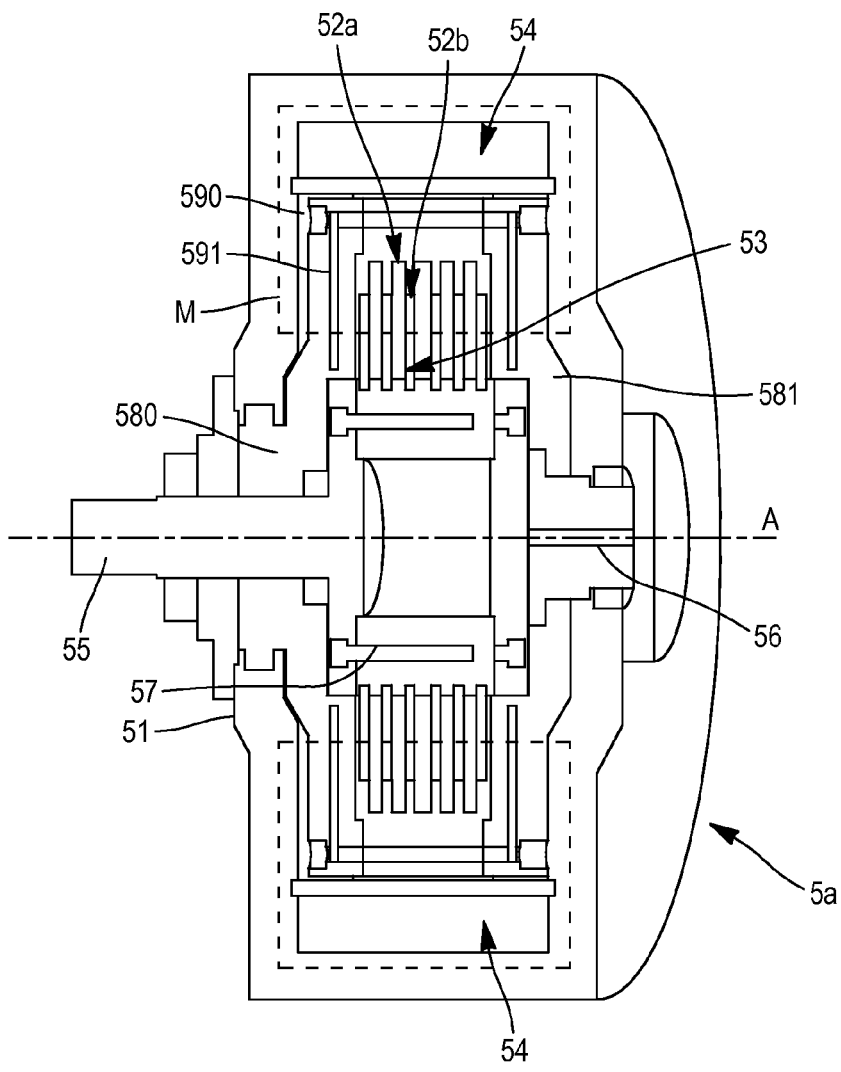
FIG. 4 is a close-up view of the magnetorheological brake of FIG. 3.

FIG. 4 shows a view of the magnetorheological brake 5a of FIG. 3 in a sectional view passing through the axis A.

The brake comprises an enclosure 51 of cylindrical shape and centered on the input shaft 55 extending along the axis A. The input shaft 55 corresponds to the motor shaft of the roll motor 3a.

The output shaft 56 of the brake is preferably coaxial with the input shaft 55. In the present example, the output shaft 56 is fixed to the mount.

Within the brake, a plurality of brake disks are comprised between a first sealed wall 580 and a second sealed wall 581. The brake comprises an alternation between a series of disks mounted on a rotor 57 secured to the input shaft 55, and a series of disks mounted secured to the output shaft 56. The brake disks are drilled in their center and preferably centered on the axis A of the shaft 55.

In particular, the brake comprises a disk 52a secured to the input shaft and a consecutive disk 52b secured to the output shaft. The disks 52a and 52b are here adapted to rotate relative to each other about the axis A, during a rotation of the output shaft relative to the input shaft.

Preferably, the disk 52a is centered on the input shaft 55 and is therefore centered on the axis A. The disk 52b is preferably also centered on the axis A.

A sealed volume adapted to receive magnetorheological fluid in the liquid state is formed between the faces of two consecutive brake disks. In particular, a fluid volume 53 is delimited by the opposite faces of the disks 52a and 52b. The sealing of each of the volumes is ensured by gasket joints at spacers between the disks. The brake comprises an alternation of brake disks and magnetorheological fluid volumes at different axial positions along the axis A.

In this example, the fluid volume comprised between two faces of consecutive disks is in contact with more than 50% of the surface of said faces.

According to the invention, a control device 54 is disposed in the vicinity of the fluid volumes. Here, the control device is formed of two coils extending parallel to the axis A in the vicinity of the brake disks. The length of each of the coils is slightly greater than the total length over which the brake disks extend.

According to one variant, the control device 54 may further comprise a permanent magnet.

A dotted line represents the field line M generated when a current flows inside a coil 54.

The magnetorheological fluid can be admitted inside the brake by means of filling channels, not represented.

The brake 5a also comprises cooling channels 591 in the vicinity of the brake disks. Air can circulate in the enclosure 51 through ventilation ducts 590.

Figure 5A:
FIGS. 5a, 5b and 5c are block diagrams of the operation of a magnetorheological fluid.
Figure 5B:
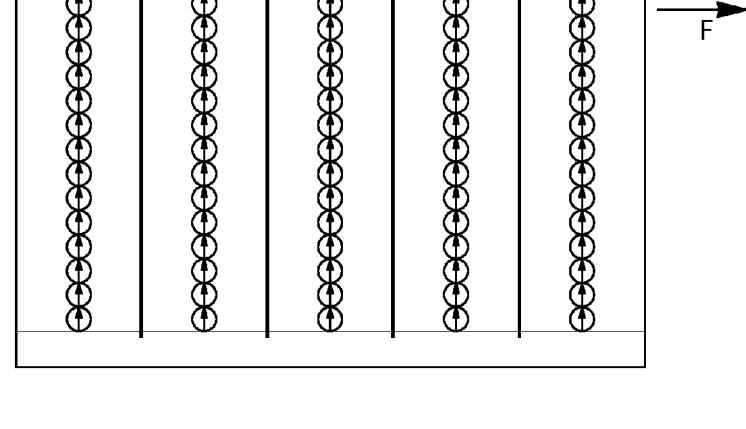
Figure 5C:
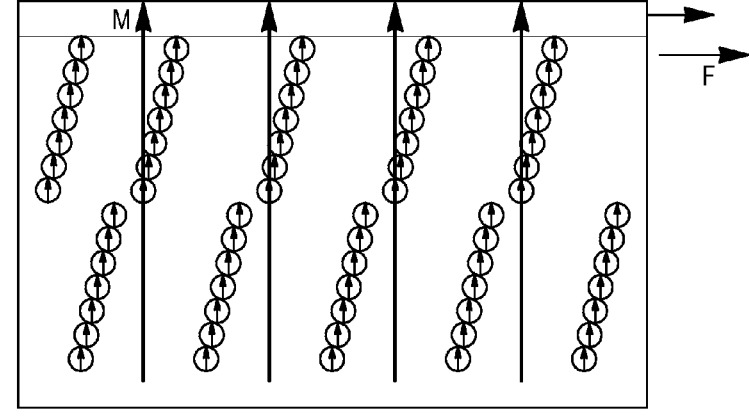

The behavior of the magnetorheological fluid of the volume 53 at rest and in the presence of a magnetic field is schematized in FIGS. 5a, 5b and 5c. A carrier fluid 531, preferably insulating carrier fluid, contains a suspension of particles 530. Preferably, the particles are of a size comprised between 1 and 10 micrometers. Metal particles, for example iron, can be used as magnetic particles. At rest, the movement of the particles 530 is random as represented by the arrow in FIG. 5a and the particles do not exert shear strength. Residual shear strength of the brake disks is exerted by the carrier fluid.

FIG. 5b represents the state of the system when a Lorentz force F is exerted on the particles 530 due to the magnetic field M. The particles 530 line up in the form of chains of particles parallel to the magnetic field lines, thereby increasing the shear strength of the magnetorheological fluid. The resisting torque of the magnetorheological fluid as a whole increases very significantly compared to the resisting torque of the carrier fluid alone.

The parts 52a and 52b shear the fluid enclosed in the volume 53 as they rotate relative to each other.

When the shear strength of the magnetorheological fluid increases, as in the state of FIG. 5b, the fluid generates a shear stress at the volume 53. The movements of the disk 52a and of the disk 52b are thus coupled.

The resisting torque of all the fluid volumes, taken together, can be sufficient to couple the input shaft 55 and the output shaft 56. If the output shaft is fixed, for example if it is fixed to the mount as in the present example, the motor shaft is braked, or even blocked, in its pivoting along the roll and/or pitch axis.

In FIG. 5c, the Lorentz force experienced by the particles 530 is increased due to the increase of the magnetic field. A slip threshold of the magnetorheological fluid has been exceeded; the particle chains are no longer able to line up with the field lines, and drift in the direction of the force F, which can locally break.

The resisting torque exerted on the lever remains substantially constant and a displacement occurs between the input and the output of the magnetorheological brake.

The shear strength exerted by the magnetorheological fluid thus depends on the magnetic field, which is itself dependent on the current applied across the coils.

Figure 6:
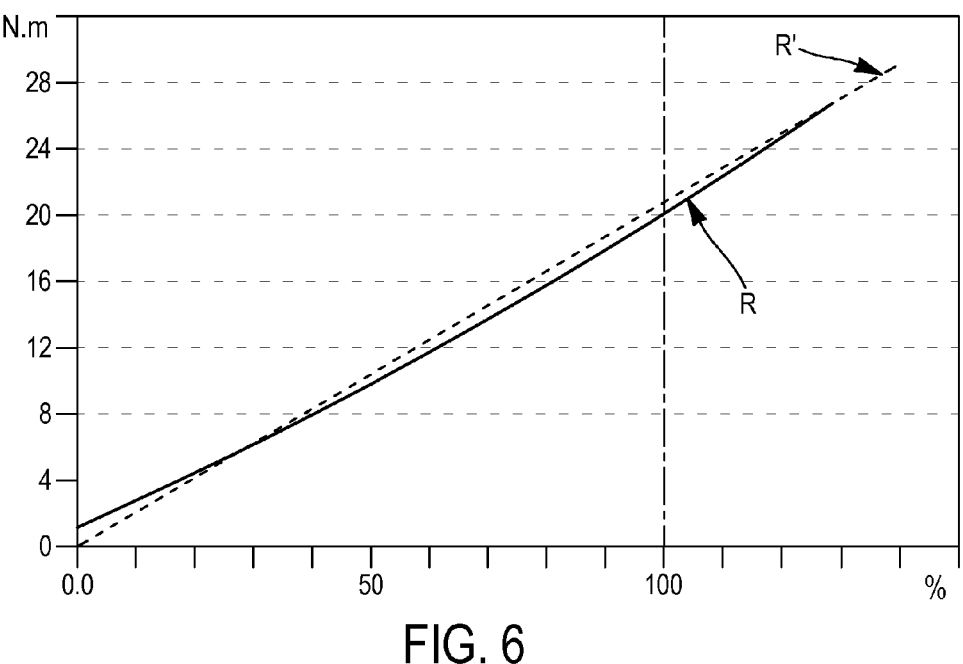
FIG. 6 is a representative curve of a resistive torque exerted by a magnetorheological brake as a function of the electric current.

FIG. 6 represents the relationship between the intensity of the current at the coils (on the abscissa) and the resisting torque generated by a magnetorheological brake (on the ordinate) according to one example.

The brake is dimensioned to provide a resisting torque of 20 N·m in optimal operation at 100% of electric current. For a DC supply voltage of 36 volts, the 100% current corresponds to 0.5 milliampere. At 0%, there is a brake preload with a torque of about 1 N·m. The torque then increases with the intensity of the current in a quasi-linear manner, according to the curve R. A linear approximation of the curve R is represented by the straight line R'.

Thus, the magnetorheological brake constitutes a satisfactory solution for exerting a resisting torque in a monitored manner.

The monitoring of this brake is simple since it suffices to control the current flowing across the magnetic field control device to vary the resistive torque, within the limits of the fluid slip threshold. This brake is therefore advantageously integrated into a pilot mini-stick to provide an additional and largely independent force feedback path relative to any existing paths based on the use of electric motors.

In addition, the magnetorheological fluid has a natural force threshold beyond which the torque exerted on the brake disks is too great for the fluid to perform its shear strength function. This ensures that the lever is set in motion if the force exerted by the pilot exceeds a certain threshold, which limits damage to the mini-stick components.

Mechanical stops can be provided in the mini-stick to perform a function of retaining the lever when the fluid force threshold is exceeded.

Figure 7:
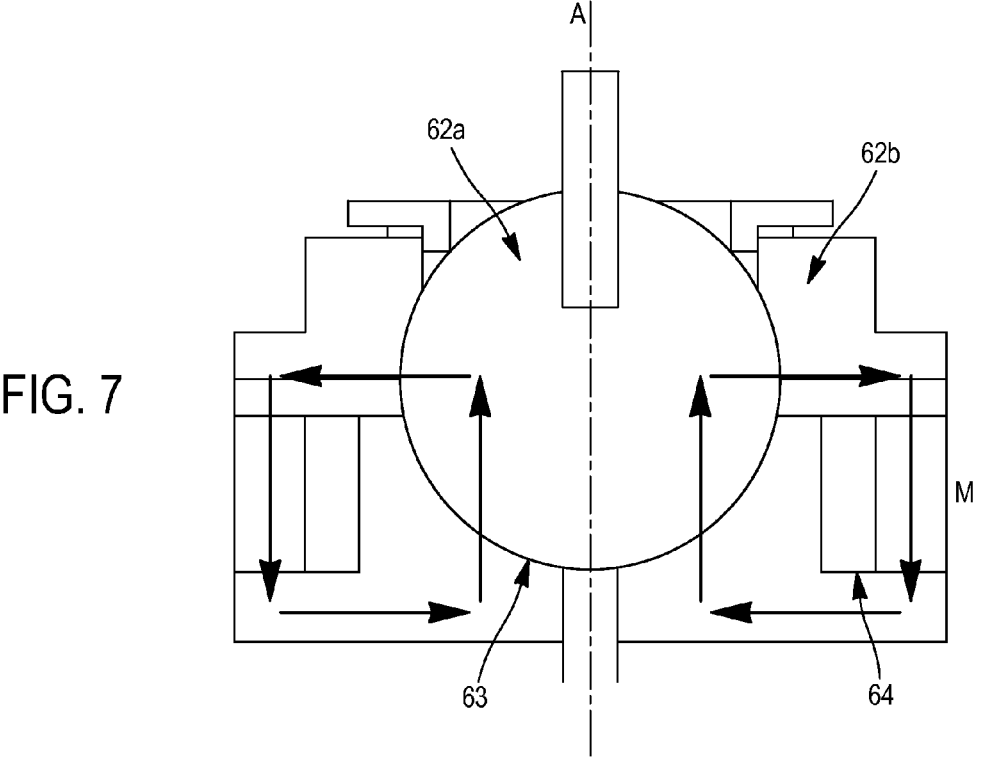
FIG. 7 is a view of a rheological brake according to a second variant.

FIG. 7 illustrates an alternative example of a magneto-rheological brake that can be used instead of the brake visible in FIG. 3.

In this example, the rheological brake comprises a sphere 62a at the center of which the motor shaft of the roll motor 3a passes, said shaft extending along the axis A. The brake also includes a spherical base 62b receiving the sphere 62a. A pivotal movement of the lever 1 along the roll and/or pitch axis causes a rotation of the shaft about the axis A and a rotary movement of the sphere relative to the base.

A lower portion of the sphere 62a, an upper portion of the base 62b and gasket joints form the fluid volume 63. Coils 64 disposed in the vicinity of the volume 63 serve as a device for controlling the magnetic field.

The coils are arranged so that the magnetic field lines M pass through a large surface of the sphere 62a. It is thus possible to monitor the shear strength at the sphere 62a and, consequently, to modulate the force feedback on the lever.

According to one variant, a first shaft of a roll motor of the lever and a second shaft of a pitch motor of the lever both pass through the sphere 62a.

If the magnetic field is sufficient, the brake thus exerts a force feedback both along the roll axis and along the pitch axis. An advantage of this variant is to use a brake threshold to brake or block the movements of the lever according to its two degrees of pivoting freedom.

Figure 8:
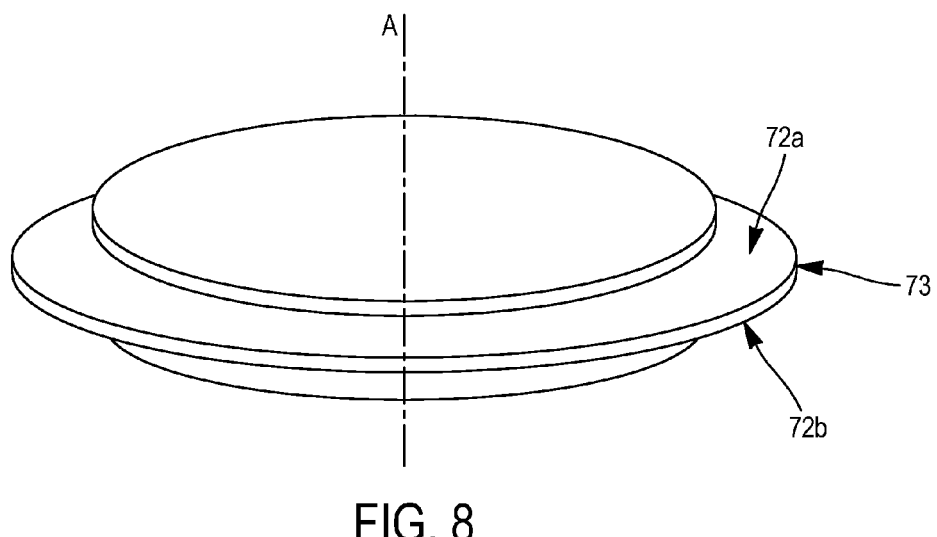
FIG. 8 is a view of a rheological brake according to a third variant.

Another alternative example of a magnetorheological brake is illustrated in FIG. 8. In this example, the magnetorheological fluid is stressed in tension and/or in compression.

The brake comprises two disks 72a and 72b centered on the A-axis motor shaft, the disk 72a being movable relative to the disk 72b in translation along the axis A. In this example, the pivotal movement of the lever along the roll axis causes a translational movement of the disk 72a, a mechanical transmission mechanism linking the shaft to the lever.

A volume of magnetorheological fluid is enclosed in a volume 73 between the two disks. A control device, not represented in the figure, is adapted to generate a magnetic field substantially parallel to the axis A.

When the magnetic field is below the slip threshold, the tensile and compressive strength of the fluid along the axis A increases with the magnetic field, itself dependent on the current across the control device.

The examples of magnetorheological brakes in FIGS. 4 to 9 are easily transposed to electrorheological brakes. The rheological material is then an electrorheological fluid comprising suspended conductive particles. The control device is then configured to apply a variable electric field at a volume of electrorheological fluid of the brake.

For a use in an aircraft pilot mini-stick, the slip torque of the rheological material is preferably comprised between 10 N·m and 100 N·m and more preferably between 10 N·m and 75 N·m. Indeed, the slip torque must be less than a threshold torque determined by the maximum torque transmissible by a seized roll or pitch motor.

Preferably, the brake must be capable of restoring a resistive force between 100 and 150 Newton, preferably about 120 Newton, on the lever.

Figure 9A:
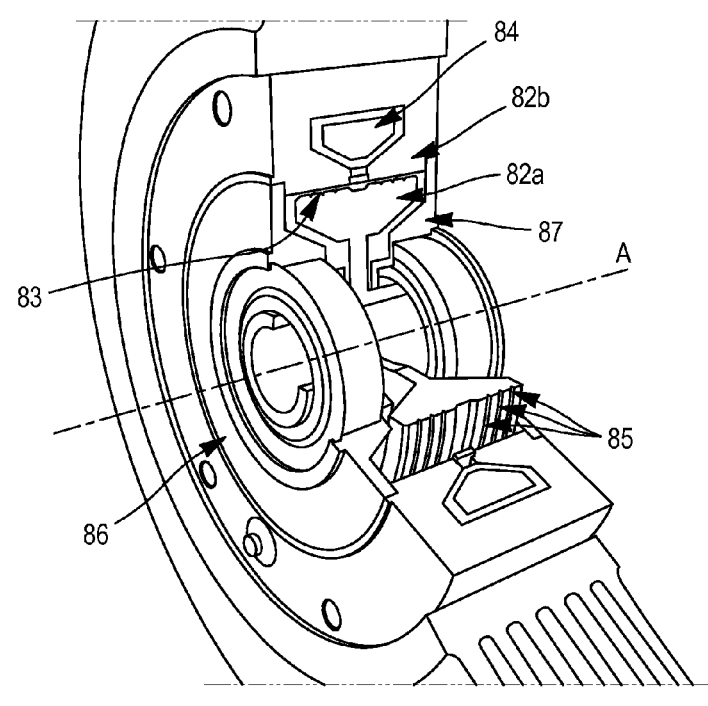
FIG. 9a is a view of a rheological brake according to a third variant.

Another example of a rheological brake has been represented in FIG. 9a. It is a powder brake. The rheological material used in this brake is a magnetic powder.

This brake consists of two brake disks 86 and 87 whose air gap is partially filled with magnetic powder in a volume 83.

The disks are centered on the axis A. The volume 83 is comprised between an outer radial surface of the rotor 82a and an inner radial surface of the stator 82b. Said two surfaces extend substantially parallel to the axis A and face each other. When the rotor 82a rotates about the axis A relative to the stator 82b, the rotor 82a shears the magnetic powder comprised in the volume 83, in particular at the teeth 85 of the rotor.

The teeth 85 correspond to channels hollowed in the outer radial surface of the rotor 82a.

Figure 9B:
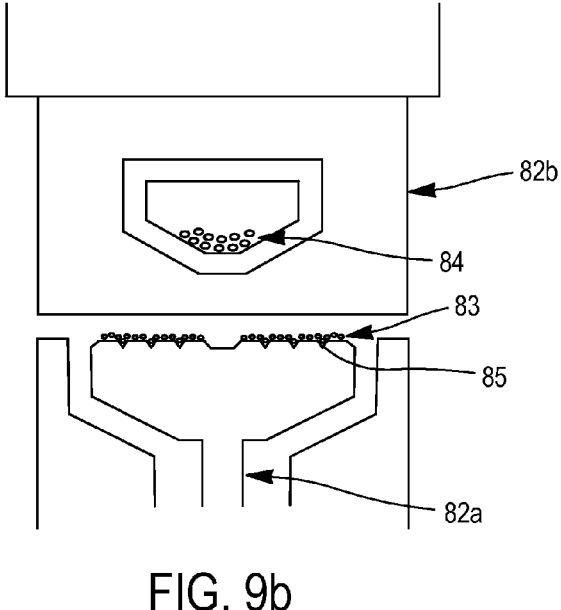
Figure 9C:
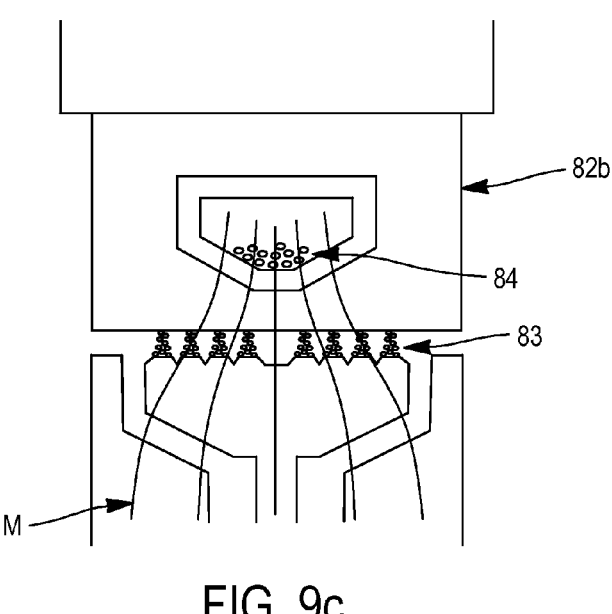

When the magnetic powder is not subjected to a magnetic field or is subjected to a negligible magnetic field, the magnetic powder is distributed by gravity in the air gap and generates a low shear strength torque, by friction between the powder and the rotor. This state of the system is represented in FIG. 9b.

Conversely, when a magnetic field is applied to the volume 83, the powder contained in the volume 83 lines up with the field lines.

Thus, the powder grains create powder structures extending between the facing surfaces of the rotor 82a and the stator 82b. These structures are visible in FIG. 9c. These structures exert a shear resistive torque exerted by the rotor 82a. The brake disks are thus coupled.

The variable magnetic field is here exerted by two coils 84 electrically controlled by the computer. The coils 84 are arranged relative to the volume 83 so that the magnetic field lines are substantially perpendicular to the facing surfaces of the rotor 82a and of the stator 82b.

The magnetic powder contained in dispersion in the volume 83 constitutes a rheological material. The shear strength of the magnetic powder exerted by the rotor depends on the magnetic field which is applied thereto, this field can be electrically monitored. The greater the magnetic field exerted by the coils, the more the resistive torque exerted by the magnetic powder increases.

On the other hand, if a slip torque is exceeded at the powder brake, the resistive torque exerted by the magnetic powder of the volume 83 no longer increases with the magnetic field, and the brake disks are no longer correctly coupled.

FIG. 10 represents an alternative example of the architecture of the force application device integrated into the mini-stick.

In this example, the brake 5a admits as output shaft the motor shaft of the roll motor 3a, and the brake 5b admits as output shaft the motor shaft of the pitch motor 3b.

The Rheological brakes correspond to any one of the examples above. Each brake is here positioned close to the mechanical joint 2, between the corresponding motor 3a or 3b and the joint 2.

In another example, a magnetorheological brake is directly linked to a pivotal movement of the lever. For example for the roll axis X of the lever, the roll movement can drive a shaft extending along the axis X, a rheological brake being positioned on said shaft, preferably in the vicinity of the mechanical joint 2.

According to a still alternative example, the motors 3a and 3b are eliminated and a damping of the pivotal movements of the lever is ensured only by the brakes.

Examples of methods for using a pilot mini-stick with a force application device are now described. The mini-stick here comprises one or several brakes according to any one of the preceding examples. The pilot system in FIG. 1 can be configured to implement either of these two methods.

Mechanical Back-Up Monitoring

In one embodiment, the magnetorheological brake control device is configured to apply a magnetic field increasing the viscosity of the theological material in the event of fault on a processing chain of a motor (roll and/or pitch motor) associated with the brake. The processing chain of the motor comprises in particular the computer 7.

In this mode, the force application device therefore comprises a roll and/or pitch, preferably electric, motor associated with a brake which can take over from the motor in the event of fault.

A method of monitoring the force application device in mechanical back-up mode is represented in FIG. 11.

In a step 100, a fault on a processing chain of the motor associated with the brake is detected, for example a mechanical failure of the motor which is no longer able to provide sufficient force feedback on the pivot axis of the lever associated therewith, or a fault in the processing or communication of the motor control signals or a loss of power supply in the computer 7.

In a step 200, a magnetic field control is transmitted by the unit 8 to the control device of the rheological brake, for example to an electronic interface controlling a coil of the control device.

The magnetic field control is such that the viscosity of the rheological material is increased, which increases the shear strength at the brake so that the resisting torque exerted by the brake on the roll and/or pitch axis increases, without a slip threshold of the rheological material being exceeded. If the torque exerted by the pilot on the lever exceeds the slip threshold, the resistive torque of the brake no longer increases and the output of the rheological brake is set in motion relative to the input of the brake.

Preferably, the lever and the brake are dimensioned such that in a step 250, the lever is pivotally blocked along the roll and pitch axes, under the effect of the field control.

In this case, the pilot system enters at a step 300 in a force pilot mode of the stick.

In this mode, a roll force sensor 6a and a pitch force sensor 6b take over from the position and/or speed sensors on the roll and pitch axes of the lever. The pilot control signals generated by the control unit 8 (the FCU) are a function of force detection signals on the lever. Thus, the pilot monitors the movements of the movable portions of the aircraft based on the force he exerts on the lever.

The force pilot mode can then be deactivated as soon as the fault on the processing chain of the motor associated with the brake is resolved. Thus, the force sensors 6a and 6b can only be used during fault periods.

An advantage of the mechanical back-up monitoring method is that the mini-stick cannot switch to a mode where the pilot can freely pivot the lever. The monitoring of the roll and pitch axes of the lever is secured, with the rheological brake providing an additional path of application of a force on the stick.

Damping Law or Force Law Monitoring

In another mode, the magnetorheological brake control device is configured to exert a magnetic field which is a function of a position and/or speed of the lever, according to a predetermined law.

One or several brakes can act alone on the roll and pitch axes, without electric motors, to provide a force feedback on the lever according to a damping law.

A roll motor and/or a pitch motor can be associated with one or several magnetorheological brakes to restore a force on the lever according to a force law. For example, at extreme positions of the lever, the motor can provide a motor torque to return the lever to a balance position.

A method for monitoring in damping law the force application device is represented in FIG. 12.

The position of the lever is detected in a step 400 and position detection signals are transmitted to the flight control unit.

In a step 500, a magnetic field control is determined from the position detection signals, according to a predetermined damping law. The damping law is for example pre-recorded in the flight control unit 8.

The field control is transmitted to the force application device, which generates a resistive force against the pivoting of the lever in a step 550. The resistive force exerted by the rheological brake is a function of the field exerted by the brake control device, according to the rheogram of the rheological material contained in the brake.

The damping law or force law monitoring is advantageous because the rheological brakes complete or replace electric motors in their function of force feedback on the lever. It is therefore not necessary to integrate dimensioned electric motors to ensure the entire force feedback. The mass, bulk and power consumption of the pilot mini-stick can be reduced.

The invention claimed is:

1. A force application device for an aircraft pilot stick, the device comprising:
   a mechanical joint configured to receive a lever of an aircraft pilot stick, the mechanical joint being rotatably movable about a roll axis and about a pitch axis,
   a force motor comprising a motor shaft extending along a third axis, the rotation of the motor shaft about the third axis being linked to the rotation of the mechanical joint about an axis taken among the roll axis or the pitch axis, the force motor being configured to exert a resistive torque on the motor shaft,
   a rheological brake comprising two facing parts facing each other,
   the brake comprising a volume delimited by said two facing parts, the volume being adapted to contain a rheological material, one of said two parts being arranged on the motor shaft and being rotatably movable about the third axis relative to the other of said two facing parts, and
   a control device controlled to apply an electromagnetic field within said volume so as to vary shear strength of the rheological material.

2. The force application device according to claim 1, wherein the rheological material is a magnetorheological fluid comprising suspended magnetic particles, or wherein the rheological material is an electrorheological fluid comprising suspended conductive particles, the control device being controlled to apply a variable magnetic or electric field.

3. The force application device according to claim 1, wherein the rheological material is a magnetic powder dispersed between the two facing parts.

4. The force application device according to claim 1, wherein the force motor is a torque motor.

5. The force application device according to claim 1, wherein the force motor is a direct drive motor.

6. The force application device according to claim 1, wherein the rheological brake is positioned on the motor shaft opposite the mechanical joint relative to the force motor.

7. The force application device according to claim 1, wherein the rheological brake is positioned on the motor shaft between the mechanical joint and the force motor.

8. The force application device according to claim 1, the force application device comprising a motor shaft rotational speed sensor, the rheological brake being piloted according to a speed servo-control as a function of a rotational speed acquired by said sensor.

9. The force application device according to claim 1, wherein the two facing parts of the rheological brake are a first disk extending radially from the motor shaft and a second disk facing the first disk, the first disk and the second disk being centered on the third axis.

10. The force application device according to claim 1, wherein the two facing parts of the rheological brake are: a sphere centered on the third axis and at least partially immersed in the rheological material, and a spherical base.

11. The force application device according to claim 1, wherein the control device is controlled to apply an electromagnetic field increasing the shear strength of the rheological material, the event of fault on a processing chain of the force motor.

12. The force application device according to claim 11, wherein the slip torque of the rheological material is comprised between 10 N·m and 100 N·m.

13. The force application device according to claim 8, further comprising a roll force sensor configured to measure a roll torque exerted on the lever and/or a pitch force sensor configured to measure a pitch torque exerted on the lever, to allow a force-piloting of the pilot stick.

14. The force application device according to claim 1, wherein the rheological brake is configured to exert a resistive torque on the mechanical joint, a value of which is limited to 70 Nm, as a function of an electric current provided to the control device.

15. The force application device according to claim 1, wherein the control device is controlled according to a predetermined law to exert an electromagnetic field which is a function of a position and/or speed of the lever.

16. The force application device according to claim 1, wherein the force motor is a roll motor, the rotation of the motor shaft being linked to the rotation of the mechanical joint about the roll axis, the rheological brake being adapted to exert a force feedback on the roll axis the device further comprising a pitch motor comprising a pitch motor shaft extending along a fourth axis, the rotation of the pitch motor shaft being linked to the rotation of the mechanical joint about the pitch axis, and the force application device comprises an additional rheological brake adapted to exert a force feedback on the pitch axis.

17. An active aircraft pilot stick comprising:

the force application device according to claim 1, and a lever able to rotate about the roll axis and the pitch axis the lever being arranged on the mechanical joint.

18. A method for mechanical back-up monitoring of a device for applying a force on an aircraft pilot stick, the method being implemented using the force application device according to claim 1 and comprising the steps of:

detecting a fault on a processing chain of a force motor of the force application device, and generating an electromagnetic field control below a slip torque of a rheological material contained in a rheological brake of the force application device, said control being transmitted to a device for controlling the force application device to block the lever.

19. The method according to claim 18, further comprising:

activating a force pilot mode of the pilot stick.

20. A method for damping control of a device for applying a force on an aircraft pilot stick, the method being implemented using the force application device according to claim 1, the method comprising the steps of:

detecting a position and/or speed of a lever in rotation about a roll axis or a pitch axis, the lever being arranged on a mechanical joint of the force application device, generating an electromagnetic field control according to a predetermined law as a function of the detected position and/or speed, said control being transmitted to a device for controlling the force application device, so that a rheological brake of the force application device exerts a resistive torque opposing a rotational movement of the lever as a complement to a force motor of the force application device.

21. The force application device according to claim 12, wherein the slip torque of the rheological material is comprised between 10 N·m and 75 N·m.

22. The force application device according to claim 13, wherein the value of the resistive torque on the mechanical joint is limited to 25 Nm.

23. The force application device according to claim 1, wherein the rheological brake is arranged directly on the motor shaft.

24. The force application device according to claim 9, wherein the motor shaft comprises an input shaft and an output shaft and wherein the first disk is secured to an input shaft and the second disk is secured to an output shaft.

25. The force application device according to claim 10, wherein the motor shaft passes at the center of the sphere.

26. The force application device according to claim 1, wherein the one of said two parts is arranged on the motor shaft between an input shaft and an output shaft.

\* \* \* \* \*